United States Patent
Stoll et al.

[11] Patent Number: 5,603,509
[45] Date of Patent: Feb. 18, 1997

[54] STRIPPING DEVICE

[75] Inventors: Kurt Stoll, Esslingen; Herbert Köngeter, Reichenbach; Eugen Schlötzer, Schwabach, all of Germany

[73] Assignee: Festo KG, Esslingen, Germany

[21] Appl. No.: 401,862

[22] Filed: Mar. 10, 1995

[30] Foreign Application Priority Data

Mar. 12, 1994 [DE] Germany .................... 44 08 408.0

[51] Int. Cl.⁶ ...................................... F16J 15/16
[52] U.S. Cl. ...................... 277/24; 277/178; 277/181; 277/188 R; 277/189
[58] Field of Search ................... 277/166, 178, 277/181, 188 R, 188 A, 189, 24, 37, 50

[56] References Cited

U.S. PATENT DOCUMENTS

| | | | |
|---|---|---|---|
| 2,368,137 | 1/1945 | Harmon | 277/24 |
| 2,560,917 | 7/1951 | Bebinger | 277/188 R |
| 2,707,135 | 4/1955 | Monahan | 277/24 |
| 3,075,779 | 1/1963 | Holdham | |
| 3,642,290 | 2/1972 | Millsap | 277/24 |
| 4,534,239 | 8/1985 | Heimann | 277/24 |
| 4,819,854 | 4/1989 | Schmehr | 277/50 |
| 5,165,700 | 11/1992 | Stoll et al. | 277/24 |
| 5,482,296 | 1/1996 | Peppiatt et al. | 277/205 |

FOREIGN PATENT DOCUMENTS

| | | |
|---|---|---|
| 3127714 | 2/1983 | Germany . |
| 4010953 | 10/1991 | Germany . |

*Primary Examiner*—Daniel G. DePumpo
*Attorney, Agent, or Firm*—Hoffmann & Baron

[57] ABSTRACT

A stripping device comprising a stripping ring and a locating ring. The stripping ring is set on a holder in a fitted position thereof. The locating ring is resiliently elastic in design and fits in an annular groove provided in the holder for axially locking the stripping ring in relation to the holder. The stripping ring and the locating ring are attached together with the formation of a subassembly. It is in this manner that the stripping device may be relatively simply produced and handled.

18 Claims, 3 Drawing Sheets

STRIPPING DEVICE

BACKGROUND OF THE INVENTION

The invention relates to a stripping device comprising a stripping ring, which in a fitted position is secured to a holder and surrounds a component able to move in relation to it and the holder axially, a resiliently elastic locating ring fitting in an annular groove in the holder for axially locating the stripping ring on the holder, and having two mutually adjacent ring ends, which during fitting of the locating ring are able to be moved in relation to one another so as to reduce or increase their distance apart in order to produce a change in diameter of the locating ring.

THE PRIOR ART

A stripping device of this type is disclosed in the German patent publication 4,010,953 A1. It is employed more particularly for fluid power cylinders in order to strip off dirt adhering to the re-entering piston rod. In this case the holder is formed by the cylinder housing, which has an opening through which the piston rod extends and in which the stripping device is secured. During assembly of the stripping device the first step is to fit the stripping ring in the recess and then to insert the locating ring into the annular groove. The Stripping ring is a resiliently elastic component, whose periphery is interrupted at one point so that it is able to be elastically deformed temporarily to increase its diameter for insertion into the annular groove.

Such known stripping ring is a component of an elastomeric body, which at the same time bears a sealing lip and by means of a holder part thereof is secured between a step on the holder and the locating ring. In order to limit axial movements of the stripping ring, exact matching of the overall lengths of the holding part and of the intermediate space accommodating same is required, something which hardly simplifies the production process. Furthermore it is frequently difficult to remove the stripping ring firmly seated in the opening if this should be necessary.

SHORT SUMMARY OF THE INVENTION

One object of the invention is to provide a stripping device of the type initially mentioned, which using simple means renders possible secure fixation of the stripping ring on the holder and when required may be simply fitted and removed.

In order to achieve these and/or other objects appearing from the present specification, claims and drawings, in the present invention the stripping ring and the locating ring are attached together with the formation of a subassembly.

With such arrangement no further component secured to the holder is required in addition to the locating ring in order to ensure an axially fixed placement of the stripping ring. The stripping ring is coupled to the holder by means of the locating ring, which is always connected with it, in the fitted position. Accordingly, as regards the holder, the provision of the annular groove for the locating ring is sufficient as an attachment means, something which leads to a reduction in costs. Furthermore assembly and any necessary dismounting of the stripping ring is substantially simplified, since the stripping ring and the locating ring are combined as a single unit or subassembly, which may be handled as a single component and during assembly and dismounting and may be fixed or removed from the holder in a single working step.

Since on the holder the annular groove generally is sufficient for the attachment of the stripping device, technical means already present in the system and more particularly a fluid power cylinder, may be upgraded with the stripping device of the invention without any problems. More especially, axially compact dimensions may be adhered to.

The German patent publication 3,127,714 C2 discloses the joining together of two components for the formation of a single subassembly. However, in this case it is a question of a combination of a sealing element with a spring ring in connection with a flow rate control valve in the plumbing art, which is not related to the present art. The sealing element is arranged between two disks in order to produce a sealing action between same.

Further developments of the invention are defined in the claims.

In accordance with a particularly advantageous form of the invention the locating ring and the stripping ring are designed integrally and as a single component. In this respect, a plastic material is selected therefor which renders possible low-price production by molding, as for example by injection molding.

If the two ends of the locating ring are provided with engagement structures for an assembly tool, the stripping ring may be fitted as a whole in a manner of conventional locating ring.

In the intermediate space between the two ends of the locating ring there is preferably a flexible shield wall connected, preferably in an integral manner, with the two ring ends and with the adjacent part of the stripping ring. The shield wall holds back airborne dirt whereas the flexible structure ensures that the tangential deformation, necessary on assembly, of the locating ring is not obstructed. Preferably the shield wall is in the form of a undulating or folded structure.

Preferably the connection part between the locating ring and the stripping ring is designed to act as a deformation zone, which renders possible bending of the locating ring in the peripheral and radial directions in relation to the stripping ring without the outline of the stripping ring being changed thereby. Accordingly even when the piston rod has been fitted, assembly or dismounting is possible. In contradistinction to the assembly unit in accordance with the said German patent publication 3,127,714 C2 the locating ring may be elastically deformed without the stripping ring being deformed as well. Furthermore when the stripping ring is mounted on the piston rod the locating ring may be actuated.

More particularly, when the stripping ring is manufactured of plastic material it may be expedient to provide a second stripping ring of harder material in front of it, which strips off firmly adhering particles from the axially moving rod-like component. This second stripping ring is preferably manufactured of metal. It is conveniently attached to a bead-like projection on the first stripping ring, which extends in the peripheral direction of the ring and owing to a U-like wall section or outline ensures a satisfactory ability of the first locating ring provided on the first stripping ring. The bead-like projection is preferably interrupted adjacent to the point where two ends of the locating ring come together, such interruption being able to contribute to maintaining the ability of the system to deform and thus facilitating deformation as necessary for assembly purposes.

Further advantageous developments and convenient forms of the invention will be understood from the following detailed descriptive disclosure in conjunction with the accompanying drawings.

LIST OF THE SEVERAL VIEWS OF THE FIGURES

DETAILED ACCOUNT OF WORKING EMBODIMENTS OF THE INVENTION

Figure 1:
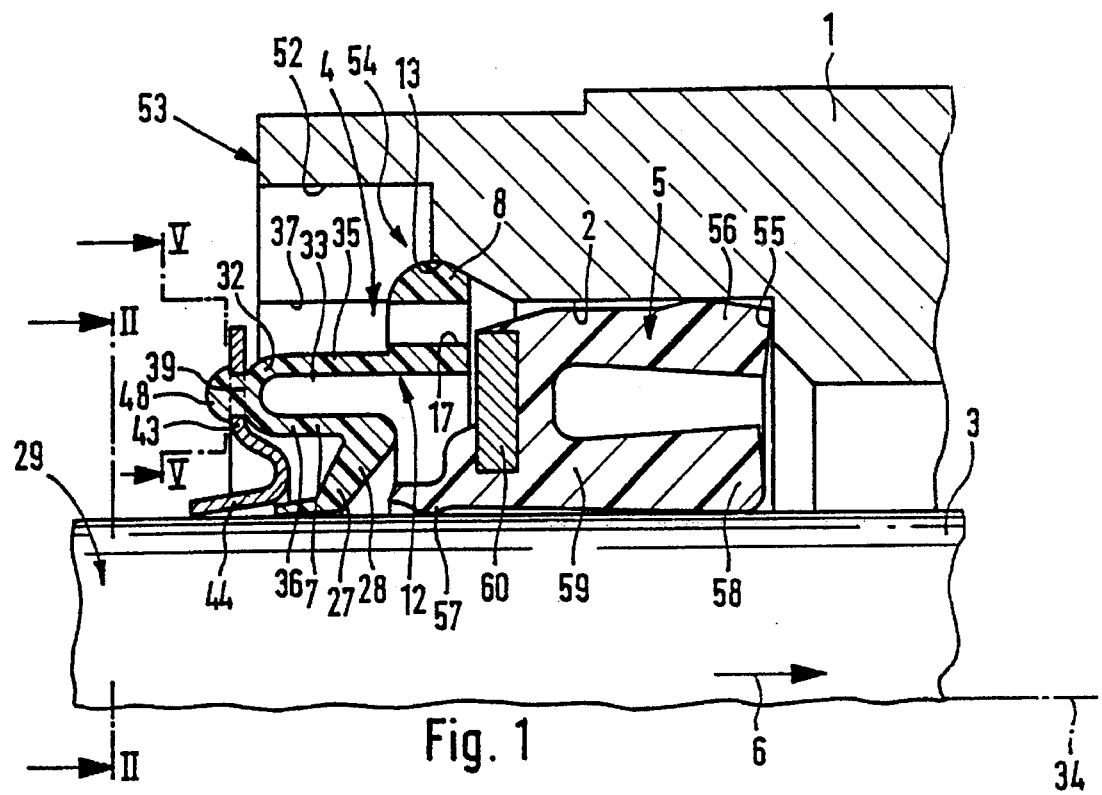
FIG. 1 shows part of a preferred constructional form of the stripping ring in accordance with the invention in the position as fitted to a fluid power cylinder as seen in a longitudinal section taken along the line I—I in an axial and radial section plane as in FIG. 2.
Figure 2:
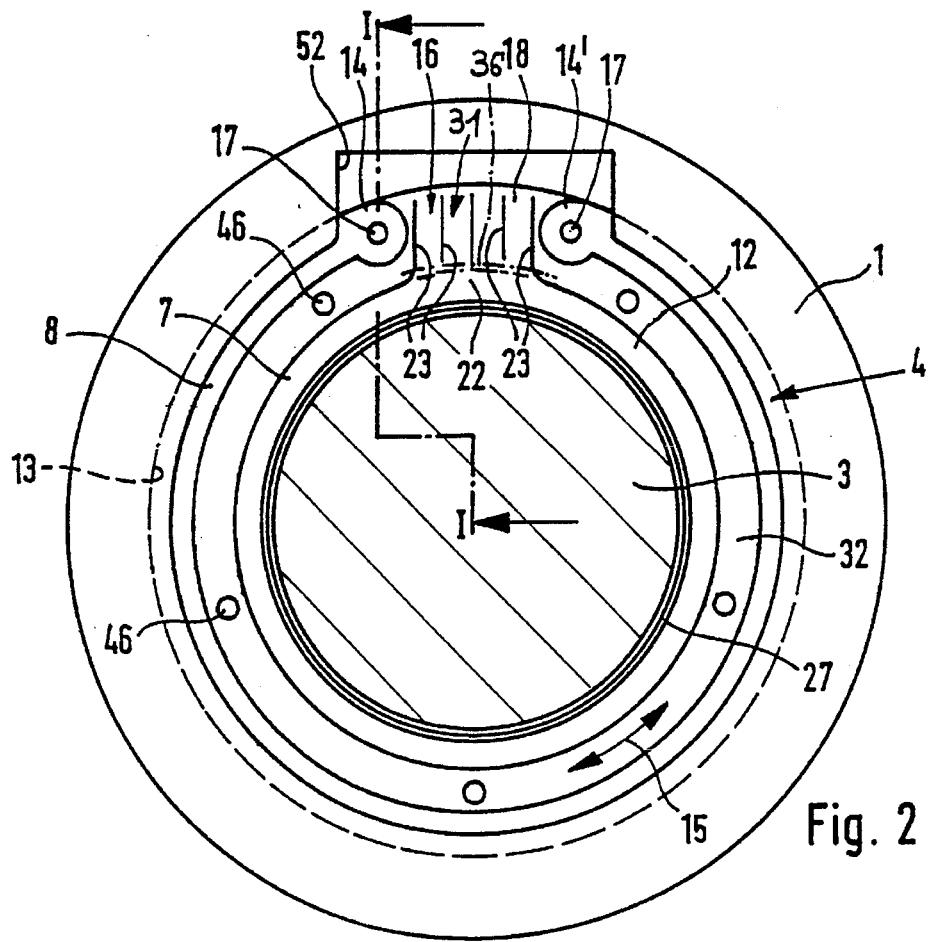
FIG. 2 shows the arrangement of FIG. 1 in front elevation in accordance with the section line II—II of FIG. 1 the front second stripping ring being omitted.

In FIGS. 1 and 2 the terminal section of the housing 1 of a fluid power cylinder is illustrated, wherein a piston, not illustrated in detail, is arranged for axial movement. Adjacent to at least one end, the housing 1 has an axial through opening 2, through which there extends a piston rod 3, attached to the piston, for axial and coaxial movement. Within the opening 2 an annular stripping ring 4 is fixed to the housing so as to assume a working position thereof, such ring surrounding the piston rod 3 coaxially. Furthermore, in the opening 2 an annular seal arrangement 5 is provided axially within the stripping device 4 on which 4 on the side thereof facing the piston which is also fixed in relation to the housing and surrounds the piston rod 3 coaxially. The seal arrangement 5 prevents emergence of fluid power medium from the internal space of the housing 1 through the opening 2. The stripping device 4 prevents entry of dirt, since it strips off dirt adhering to the outer periphery of the piston rod 3, such piston rod 3 moving as indicated by arrow 6 axially.

The housing 1 consequently constitutes a holder for the stripping device 4 and the seal arrangement 5, the latter cooperating with the rod-like component here in the form of a piston rod 3 with a dynamic contacting action.

The stripping device 4 comprises a stripping ring 7 and a locating ring 8 which is arranged coaxially in relation to the same and possesses resilient properties. The stripping ring 7 and the locating 8 are attached together at all times, such attachment preferably being by having an integral connection. In the case of this design in accordance with this embodiment, the stripping ring 7 and the locating ring 8 are manufactured as an integral, uniform ring part 12 with an annular stripping part and an annular locating part. The stripping ring 7 and the locating ring 8 consequently constitute a jointly handled subassembly; fitting of the stripping ring 7 and the locating ring 8 in the opening 2 is performed in common in one and the same working step. Separate handling of different components is accordingly unnecessary, something which substantially simplifies assembly. Furthermore, as regards the mechanical design of the opening 2 accommodating the stripping ring 4, only a few easily fulfilled requirements apply not involving any expense, are required, since the ring part 12 and accordingly the stripping ring 7 are exclusively attached to the holder 1 by means of the locating ring 8. It is quite possible to do without any additional support in relation to the holder adjacent to the stripping ring 7.

The locating ring 8 is seated in an uninterrupted annular groove 13 fashioned in a cylindrical internal peripheral surface of the opening 2. The locating ring 8 itself is interrupted at one point on its periphery. The two adjacent ends 14 and 14' of the locating ring 8 being spaced apart in the peripheral direction 15 of the ring the diameter of the locating ring 8 and of the annular groove 13 and are so related to one another that the locating ring 8 is held with a radial clamping effect in the annular groove 13 with a radial biasing action. As already mentioned, the locating ring 8 is able to be resiliently deformed, its external diameter being larger in the unfitted state than the internal diameter of the annular groove 13. For assembly the locating ring 8 is bent in the peripheral direction 15, the intermediate space 16 between the two ring ends 14 and 14' being reduced in size so that the external diameter of the locating ring 8 is reduced to a size which renders possible coaxial insertion into the opening 2 as far as the annular groove 13. Here the locating is released again so that owing to the resilient tendency to expand it will releasably snap into position and be firmly seated. As an assembly tool, use is preferably made of assembly pliers, not illustrated, which may be applied to the two ring ends 14 and 14'. Such ends, therefore, have tool engagement parts 17 in the form of recesses, into which the assembly pliers may be inserted with an interlocking effect in order to then squeeze the locating ring 8 together without any problems.

In the case of an integral design of the ring part 12, it is to be recommended to use a material which is of the same consistency throughout, more particularly a plastic material and more particularly a polymer material. However metal would be suitable as well, such as spring steel material in a stainless form.

The locating ring 8 is preferably located in the radially outer peripheral part of the stripping ring 7. It is in this manner that the intermediate space 16 is delimited radially inward by the stripping ring 7. The intermediate space 16 may be open so that in it an axial opening is present which is radially open to the outside. In the case of the illustrated embodiment of the invention the intermediate space 16 is however not open but rather shut off by a flexible shield wall 18, which is more particularly to be seen in FIG. 3. The shield wall 18 is more particularly integrally molded on the delimiting part 22, defining the intermediate space 16 radially inward, and of the stripping ring 7 and extends as from this point radially outward as far as the extended outer diameter line of the locating ring 8. It also being molded to the side adjacent to the two ring ends 14 and 14', more particularly integrally on the locating ring 8 and, respectively, the adjoining parts of the stripping ring 7. Accordingly, it is possible to prevent dirt finding its way between the stripping device 4 and the holder 1 adjacent to the intermediate space 16; there is a peripheral non-interrupted seal between the stripping device 4 and the wall of the annular groove 13.

Owing to the flexibility of the shield wall 18 the ability of the locating ring 8 to deform fully is not impaired. The shield wall 18 could for instance be in the form of a rubber-elastic membrane, which is stressed to a greater or lesser extent dependent on the width of the intermediate space 16. Owing to the stripping function the ring part 12 is however normally to be manufactured of a stiffer, harder material, in which case the necessary flexibility is produced by having an undulating or folded design of the shield wall 18. The lines 23 through the apices of the individual undulation or fold sections will then extend substantially radially, the height of the wave or folds preferably increasing radially to the outside from the delimiting part 22. In the case of the embodiment the shield wall 18 possesses two axially external proud undulation apices 24 in the fitted position, between which there extends an undulation trough 25 and which beyond the central undulation trough 25 merge with a respective undulation trough 26, adjacent to which however they are molded on the ring ends 14 and 14'. If the locating ring 8 is deformed to reduce the diameter thereof, then the undulation height will be increased while simultaneously reducing the undulation width.

On the inner side radially opposite to the locating ring 8 the stripping ring 7 has an annular non-interrupted stripping lip 27. Its free end is, as seen in the fitted position, turned outward oppositely to the inward movement direction 6, its free end preferably converging obliquely at a small acute angle toward the external surface 29 of the rod-like component 3. It is in this manner that an optimum stripping action will be ensured. The stripping lip 27 may also have an angled form, it being bent or angled once in the embodiment so that following the relatively gently sloping terminal part there is a steeper further part 28.

In the concentric part placed radially between the locating ring 8 and the stripping lip 27 the stripping ring 7 has a bead-like projection 32 or bulge, which as seen in the fitted position projects axially outward opposite to the direction 6 of inward motion. Same constitutes a deformation zone, which isolates the stripping ring 7 from the locating ring 8 so that the latter may be squeezed together or expanded during assembly or dismounting in a manner independently from the stripping ring 7 and its stripping lip 27. The projection 32 extends concentrically about the stripping lip 27 and accordingly in the peripheral direction 15 of the ring. Adjacent to the projection or bulge 32 the stripping device 4 is U-like in cross section, there being a groove-like recess 33 at its rear side and corresponding to the recess of the U-like structure and preferably extending over the entire peripheral length of the projection or, respectively, bulge. The upright axis of the U-like structure is in this case set in the longitudinal direction 34 of the ring part 12 so that the open recess 33 is in the direction 6 of inward motion. Accordingly at the projection or, respectively, bulge 32 there are two mutually coaxially surrounding hollow cylindrical wall sections 35 and 36, which are spaced from each other radially, the stripping lip 27 being formed on the free terminal part of the external wall section 36. The connection part, provided in the apical position 39 of the projection or, respectively, bulge 32, between the two wall sections 35 and may be a deformable section in order to permit relative bending of the two wall sections 35 and 36 together. The external wall section 35 is preferably longer than the internal wall section 36 so that the locating ring 8 as seen in cross section in accordance with FIG. 1, is axially set back from the stripping ring 7, something which further improves the ability of the locating ring to radially deform in relation to the stripping ring 7. The stripping ring 7 then, in the fitted position, preferably assumes a position in the axially external adjoining opening part 37.

It would be possible for example to design the deformation part like folded structure. Accordingly it is possible for the locating ring also to be actuated without the outline of the stripping lip being changed and more particularly without any outward bulging of the same in the radial direction.

In order to ensure that the stripping ring 7 is suitably deformably elastic in the part adjoining the intermediate space 16 and in order to ensure the degree of deformation of the locating ring 8 required for assembly the bead-like projection or bulge 32 is preferably interrupted at 31 in the radially adjacent zone of the intermediate space 18 or, respectively, the shield wall 18 provided here. Such interruption 31 may be for example limited to the external wall section 35 and possibly in addition to the adjacent apical part 39. Accordingly at least the internal wall section 36 will remain, as is indicated in FIG. 2 at 36'. This design is more particularly to be recommended if the above mentioned intermediate space 16 is open. It is then possible to ensure that dirt collecting axially within the stripping device 4 may escape to the outside. If the recess 33 is additionally filled with grease, penetration of dirt from the atmosphere will be checked.

Figure 3:
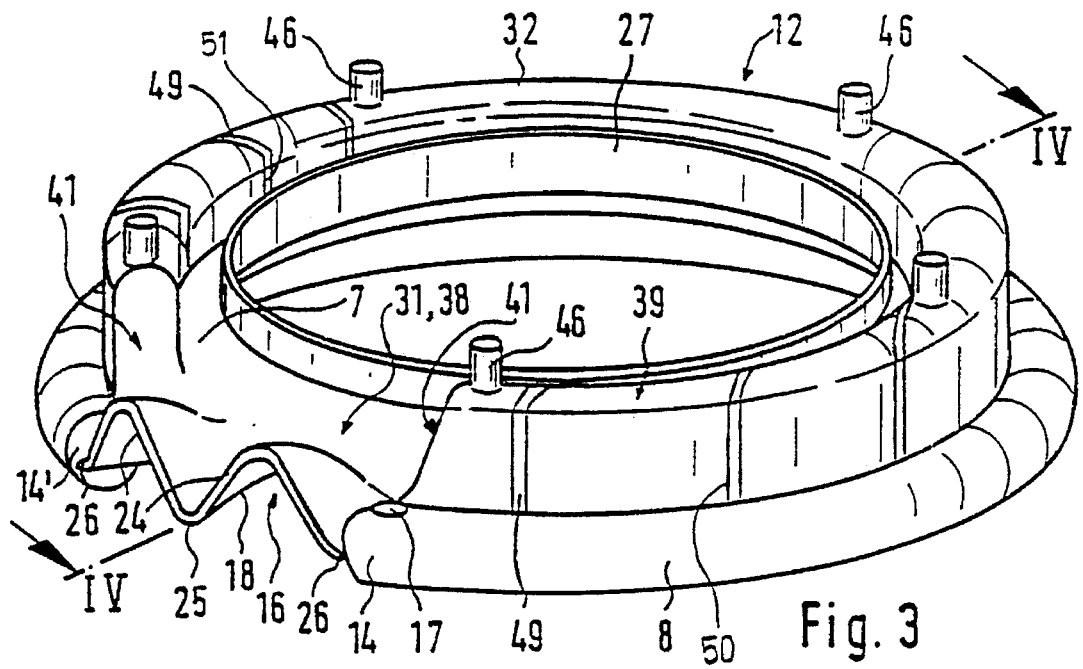
FIG. 3 shows a perspective elevation of a ring part in the form of a unit composed of the stripping ring and the locating ring.
Figure 4:
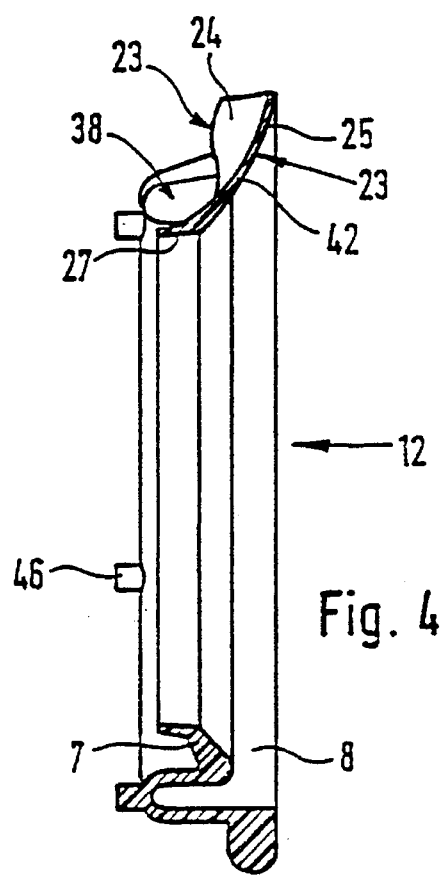
FIG. 4 is a cross section taken through the combined ring part of FIG. 3 in accordance with the section line IV—IV.
Figure 5:
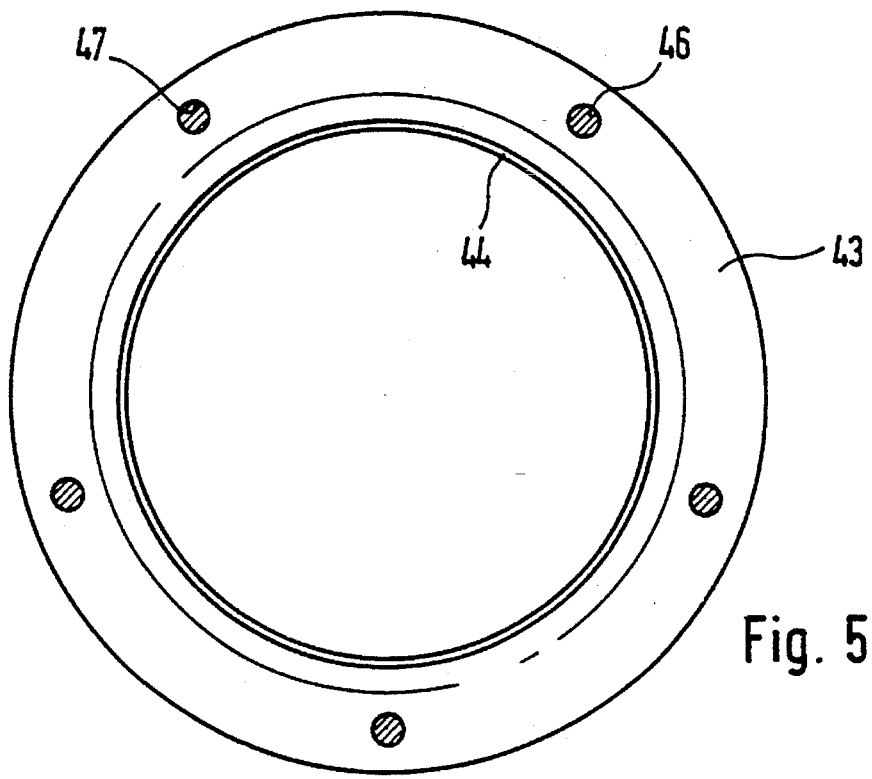
FIG. 5 shows the front second stripping ring of FIG. 1 as seen from the front in accordance with the section line V—V.

In the case of the embodiment illustrated, the interruption 31 is however designed to extend radially without interruption and accordingly extends along the inner wall section 36 so that as shown in FIG. 3 a gap 38 or, respectively, a free space is present, with which the stripping lip 27 without a bead with a evenly curved wall section 42 (FIG. 4) merges into the shield wall or the open intermediate space provided instead of same. At its mutually adjacent ends 41 the projection or bulge 32 is then preferably closed.

If required the projection or, respectively, bulge 32 may serve as a support for a further second stripping ring 43. Such a ring is present in the embodiment. It is coaxially placed (in a direction opposite to the direction 6 of inward movement) in front of the first stripping ring which is integrally connected with the locating ring 8. In the fitted position of the stripping device 4 it has a stripping lip 44 also in engagement with the external periphery 29 of the rod-like component 3. At least adjacent to the stripping lip 44 it consists of a harder material than the stripping ring 7 so that it will be able to clear coarse and more firmly adherent particles from the component 3 without any substantial wear. Since accordingly such dirt may be kept clear of the following first stripping ring 7, the latter can be softer at least adjacent to the stripping lip 27 than the second stripping ring 43 so that with respect to the component 3 there is a snug fit and even very minute particles or drops of liquid are reliably cleared. In the case of the working embodiment the second front stripping ring 43 is manufactured of metal and more particularly of stainless steel.

Figure 6:
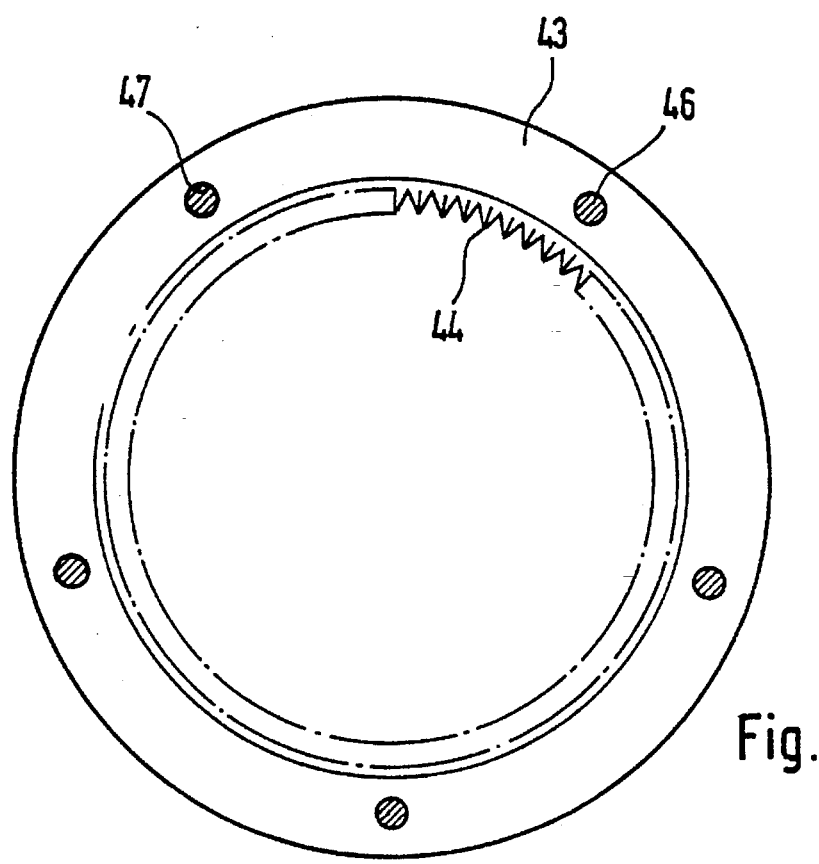
FIG. 6 shows a further embodiment of the second stripping ring in a showing similar to that of FIG. 5.

In the case of the modification depicted in FIG. 6 for the second stripping ring 43, the stripping lip 44 is made with a folded or zigzag form in the part contacting the rod-like component, this meaning that there is a certain ability to deform to allow for inaccuracies in manufacture in the diameter of the rod-like component 3.

The position of attachment of the second stripping ring 43 is preferably the apical part 39 of the bead-like projection 32, which part projects outward axially in the fitted position opposite to the direction 6 of inward movement. Here there are—with a spacing in the axial direction 15—several axially aligned molded stubs 46. They originally have the column-like or knob-like configuration as indicated in FIG. 3. The second stripping ring 43 has a number of recesses, provided in the form of through openings 47, arranged to correspond to the distribution of the stubs 46 and the ring 8 is mounted coaxially on the apical part 39 so that the stubs 46 extend through the openings 47. The proud terminal section are then deformed as widened out heads 48, which urge the stripping ring 43 against the apical part 39. Such attachment, comparable with rivetting, is relatively simple to produce and leads to a high degree of lasting strength. Deformation is preferably caused by the supply of heat, for example using an ultrasonic welding technique. The points of attachment at 46 should be removed as far as possible from the intermediate space 16 so that the second stripping ring 43 placed in position does not limit the capacity for deformation as required for fitting the stripping ring 4.

The openings 47 are preferably located in a disk-like or washer-like terminal part of the stripping ring 43 of the steel disk which is suitably formed and perforated as a whole.

If a second stripping ring 43 is present, same will preferably constitute, together with the first stripping ring 7 and the locating ring 8, a subassembly which may be handled in the manner described above. Again also a single part must be fitted.

It may be an advantage to provide the bead-like projection 32 with several slots 49 spaced in the peripheral direction as is indicated in FIG 3, however, such slots are not required as shown in FIG. 2. The same interrupt the U-like cross section, more particularly completely, that is to say they extend in each case over the internal and the external wall section 35 and 36 and the apical parts 39 connecting same. The transverse slots 49 improve the tangential ability to deform of the locating ring 8 during assembly. The part, which is diametrally opposite to the interruption 31, of the bead-like projection 32 may be left without any slots, but it is advantageous to provide the transverse slot arrangement in the parts, which adjoin the interruption 31, with an extent of for example 120°.

Preferably the transverse slots 49—as considered looking axially as in FIG. 2—do not extend exactly radially but are rather directed at a tangent to the stripping lip 27. They may for instance extend tangentially to the stripping lip 27. The radially outer part 50 thereof associated with the outer wall section 35 is preferably, as considered in the peripheral direction, nearer the interruption 31 than their radially internal part 51 associated with the internal wall section 36. If during assembly the two ring ends 14 and 14' are moved together, the width of the transverse slots 49 will be reduced as well and will therefore enhance the ability to deform of the locating ring 8 without deformation of the stripping lip 27.

In order to improve use of the above mentioned assembly tool, the opening 2 preferably has a groove-like longitudinal recess 52 at one point on the periphery thereof, such recess 52 being open toward the end surface 53, which is directed opposite to the direction 6 of inward movement, of the holder 1, while its opposite terminal part adjoins the annular groove 13 (at 54). The width the of longitudinal recess 52 is greater than the distance between the two tool engagement parts 17. Accordingly a window, clearly indicated in FIG. 2, will remain rendering possible insertion of the assembly tool without any trouble.

The initially mentioned annular seal arrangement 5 is preferably held in the fitted position by the rings 7, 8, 43 constituting the fitting unit. The locating ring 8 extends radially some distance into the opening 2 so that it flanks the seal arrangement 5 at the facing end axially. The opposite end surface of the seal arrangement 5 abuts an annular step 55 in the opening 2. Preferably the seal arrangement 5 possesses an outer sealing lip 56, which cooperates with the internal peripheral surface of the opening 2 and furthermore two internal sealing lips 57 and 58 extending in opposite axial directions, same being in contact with the rod-like component 3. All sealing lips 56, 57 and 58 are annular in design are aligned coaxially to one another. They preferably constitute an integral component of an elastomeric part 59, into which at least one integral support ring 60 may be at least partially embedded, such ring 60 consisting of a harder material and for example consisting of a metal.

We claim:

1. A stripping device comprising:

a stripping ring, which in a fitted position is secured to a holder and surrounds a component able to move axially in relation to the stripping ring;

a resiliently elastic locating ring fitting in an annular groove in the holder for axially locating the stripping ring on the holder, the locating ring having two mutually adjacent ring ends, which during fitting of the locating ring are able to be moved in relation to one another so as to reduce or increase their distance apart in order to produce a change in diameter of the locating ring, wherein the stripping ring and the locating ring are attached together with the formation of a subassembly; and an intermediate space disposed between the two ends of the locating ring, a flexible shield wall being integrally connected with the two ring ends and with an adjacent portion of the stripping ring.

2. The stripping device as set forth in claim 1, wherein the shield wall extends between the two ring ends in an undulating manner.

3. The stripping device as set forth in claim 1, wherein the stripping ring is supported in the fitted position exclusively by means of the locating ring on the holder.

4. The stripping device as set forth in claim 1, wherein the locating and stripping ring are followed in position by a separate annular sealing arrangement, which is held in place by the locating ring and stripping ring.

5. The stripping device as set forth in claim 1, wherein the annular groove is formed in the internal peripheral surface of an opening provided in the holder.

6. The stripping device as set forth in claim 5, wherein at a point on the periphery of the opening the holder possesses a longitudinal recess intersecting the annular groove and provided in the internal periphery surface of the opening, the width of the longitudinal recess being greater than the distance between the ends of the locating ring in the assembled state thereof.

7. A stripping device comprising:

a first stripping ring, which in a fitted position is secured to a holder and surrounds a rod-like component able to move in axial relation to the first stripping ring;

a radial first stripping lip annularly depending from said first stripping ring and located in the fitted position on the periphery of the rod-like component a resiliently elastic locating ring fitting in an annular groove in the holder for axially locating the stripping device on the holder;

a connection part disposed radially between and connecting the first stripping ring and the locating ring;

a deformable part which is constituted in the connection part which renders possible flexure of the locating ring in relation to the first stripping lip;

a bead-like projection radially disposed between the locating ring and first stripping lip, such projection extending in the peripheral direction of the first stripping ring and constituting the deformable part and having on a front side a rounded apical part and a recess on a rear side thereof, a second stripping ring set externally on the apical part of the bead-like projection, the second stripping ring being placed coaxially in front of the first stripping ring fixedly connected with the locating ring; and a plurality of stubs arranged on the apical part of the bead-like projection, the second stripping ring being mounted on such stubs and having complementary recesses therefor.

8. The stripping device as set forth in claim 7, wherein the bead-like projection is interrupted in a part radially adjacent to the deformable part of the locating ring.

9. The stripping device as set forth in claim 8, wherein the interruption is radially continuous in such a manner that between two terminal parts of the bead-like projection a free space is formed.

10. The stripping device as set forth in claim 7, wherein the bead-like projection includes a plurality of peripherally spaced transverse slots extending obliquely in relation to the radial direction, the slots extending from the apical part toward and into said recess.

11. The stripping device as set forth in claim 7, wherein the second stripping ring includes a material harder than the material of the first stripping ring.

12. The stripping device as set forth in claim 11, wherein the second stripping ring possesses a second stripping lip which in a fitted condition thereof engages an external periphery of the rod-like component.

13. A stripping device comprising:

a single unitary annular body including a locating ring adapted to be removably securable within a holder; and a first stripping ring coaxially disposed in relation to and radially inside said locating ring, the first stripping ring including an annular stripping lip depending therefrom, said lip projecting radially inwardly for engagement with a rod-like component that is movable in relation thereto;

a deformation zone having an outer and an inner radially spaced cylindrical wall section disposed between said locating ring and said stripping lip thereby permitting independent radial deflection of said locating ring without deformation of said stripping lip, said outer and inner walls defining a groove-like recess, and said outer and inner walls having a front and back end, said back end of said outer wall forming said locating ring, said back end of said inner wall forming said stripping ring;

a connection part joining said front ends of said outer and inner walls, said connection part having a plurality of stubs spaced apart in a peripheral direction thereon; and a second stripping ring being placed coaxially in front of said first stripping ring and being set externally on said stubs and secured to said connection part by said stubs.

14. A stripping device as described in claim 13, further including a deformable concentric part, radially disposed between said locating ring and said stripping ring, said concentric part allowing for said locating ring to deform independently of said stripping ring.

15. A stripping device as described in claim 13, wherein said locating ring further includes at least one intermediate zone formed by an interruption of material of said locating ring and said outer cylindrical wall, said intermediate zone facilitating deformation of said locating ring for positioning in said holder.

16. A stripping device as described in claim 15, wherein said locating ring includes a plurality of intermediate zones.

17. A stripping device described in claim 13, wherein said annular device is formed of a polymer material.

18. A stripping device described in claim 13, wherein said outer wall is axially longer than said inner wall.

* * * * *

UNITED STATES PATENT AND TRADEMARK OFFICE
CERTIFICATE OF CORRECTION

PATENT NO. : 5,603,509
DATED : February 18, 1997
INVENTOR(S) : Stoll, et al.

It is certified that error appears in the above-indentified patent and that said Letters Patent is hereby corrected as shown below:

<u>Column 6, Line 4,</u>   now reads "intermediate space 18", should read

-- intermediate space 16 --;

Signed and Sealed this

Twelfth Day of August, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,603,509
DATED : February 18, 1997
INVENTOR(S) : Stoll, et al.

It is certified that error appears in the above-identified patent and that said Letters Patent is hereby corrected as shown below:

<u>Column 7, Lines 28 and 29,</u>  now reads "as considered looking axially as in FIG. 2", should read --as in FIG. 3--;

Signed and Sealed this

Twenty-first Day of October 1997

Attest:

BRUCE LEHMAN

Attesting Officer  Commissioner of Patents and Trademarks